March 7, 1933.　　M. MATHEWS　　1,900,654
DEVICE FOR EXTRACTING METAL MEMBERS
Filed Oct. 30, 1931
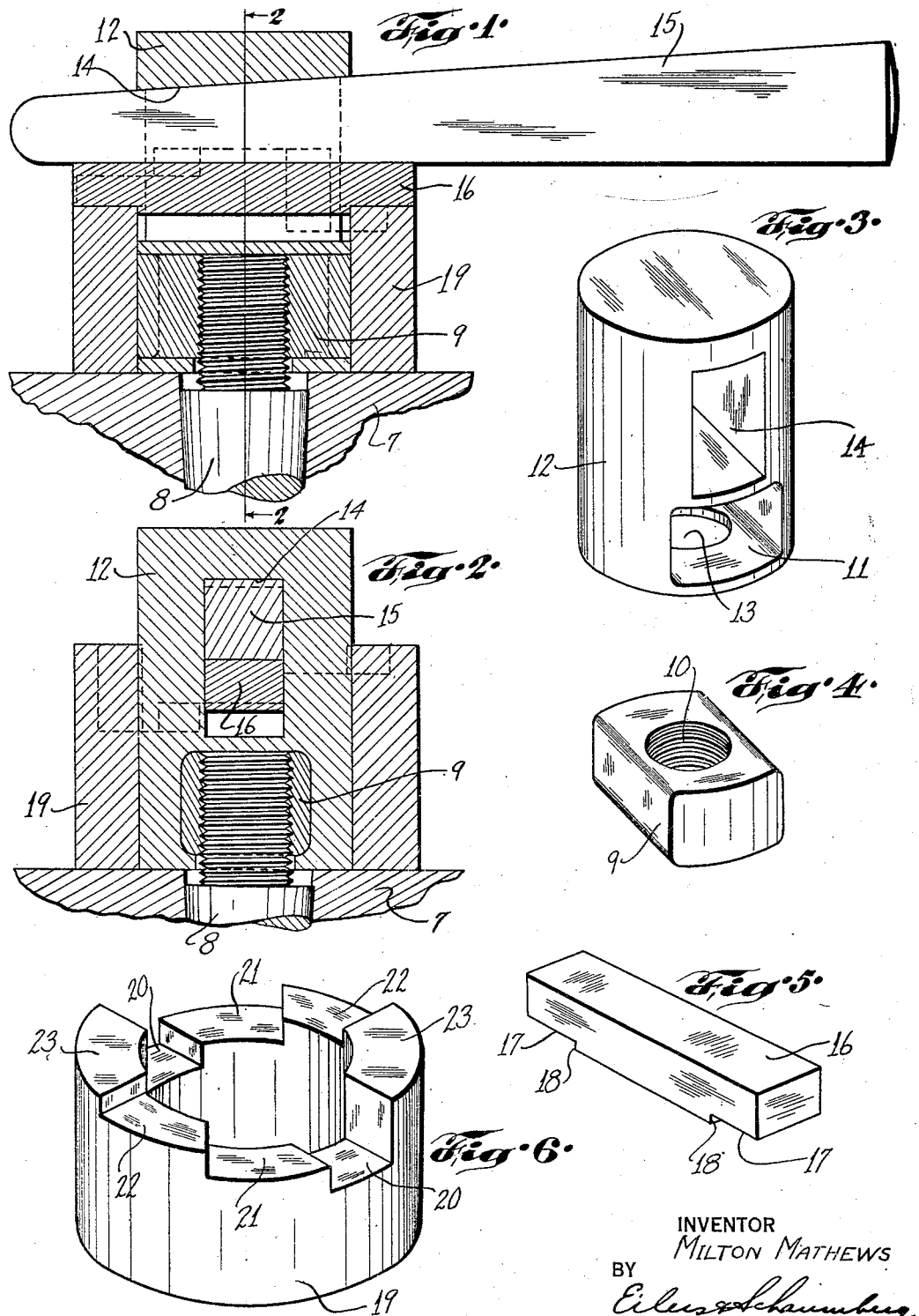
INVENTOR
MILTON MATHEWS
BY
ATTORNEYS Patented Mar. 7, 1933

1,900,654

UNITED STATES PATENT OFFICE

MILTON MATHEWS, OF SEDALIA, MISSOURI

DEVICE FOR EXTRACTING METAL MEMBERS

Application filed October 30, 1931. Serial No. 572,032.

This invention relates to improvements in devices for extracting metal members and more particularly devices for use in extracting threaded studs and the like from forgings, castings and like members in which they may have been initially seated for securement purposes.

In connection with certain classes of equipment, particularly railway rolling stock and the like, threaded studs and like elements are often employed to the end of effecting securement to each other, of two or more metal members. For example, two or more frame members are often secured together by use of one or more tapered studs each threaded at its opposite ends, where it projects through and beyond the members secured thereby. When the necessity arises for replacement or repair of parts thus secured, such a stud must obviously be extracted or pulled by engagement of the tapered member near its largest end, usually only one end being accessible. Otherwise expressed, the extracting pull must be directed with the taper rather than against the same.

An object of the present invention is attained in the provision of a simple and rugged device whereby studs of substantial size may be removed with a minimum of effort, and in a few minutes time.

A further object of the invention, broadly considered, is attained in a device for pulling threaded members toward the device, with a view of extracting such members from threaded or other seats in castings and like elements.

Yet another object of the invention is attained in a device for the purpose noted, so constructed that a stud or other threaded member may be removed from its seat, upon application of a force at a right angle to the axis of the member to be extracted, whereby a minimum clearance is required both for the pulling device, and for its actuation.

Yet another object of the invention is attained in an improved arrangement for withdrawing a stud or like threaded member from the element in which it is seated, as distinguished from certain devices such as wheel pullers, now known to the art, in which a wheel or like element is pulled off of, or away from an element on which it is seated, such as an axle or shaft.

A still further object of the invention is attained in a device of the class described, through an assembly of extracting elements with which may be detachably associated any one of a plurality of threaded members of a variety of sizes.

Further objects and advantages of the invention will appear as the description proceeds, and from the accompanying drawing of a presently preferred executional embodiment of the invention.

In the drawing:

Fig. 1 is a vertical sectional elevation through the device as applied for the purpose of extracting a tapered stud, having a threaded end, by moving the stud forwardly of the face of a casting or like member in which the stud is seated; Fig. 2 is a vertical section at a right angle to the showing of Fig. 1, and as viewed along the line 2—2; Fig. 3 is an elevation in perspective of an element designated for convenience as a stud puller block; Fig. 4 is an elevation in perspective of a nut adapted to engage an element such as a stud, to be extracted, and adapted to be received within the puller block shown by Fig. 3; Fig. 5 is an elevation in perspective of an element serving as a seat for the wedge member appearing in Fig. 1, and which for convenience is designated as a pressure block, and Fig. 6 is an elevation in perspective, of an element which I have chosen to designate as a step housing and which serves, according to the present example, to provide a plurality of wedge seats at variously spaced distances from the face of the member from which the threaded element is to be removed.

Referring now by characters of reference to the drawing, 7 indicates a fragmentary portion of a plate, casting, forging or like element in which there is initially seated, before extraction is undertaken, a stud element 8 having a threaded end projected outwardly beyond the face of the member 7, and usually, in service, engaged by a nut (not shown). It is my preference to provide, for engagement with the projecting stud end, a nut 9 shown as being of substantially rectangular outline, provided with a central, internally threaded portion 10, corresponding in pitch and size to the projecting end of the stud to be extracted. The nut 9 is constructed conformably in size and shape to a pocket 11 extended transversely preferably through the lower end of a cylindrical member 12 (Fig. 3), the element 12 being in the nature of a tension element, and hereinafter referred to, for convenience, as a stud puller block. The lower wall of the block 12 is apertured as at 13 to enable the application of the block over the projecting stud end. The block 12 is provided with a vertical transverse eye or passage 14, extended through its upper portion, and adapted, as will hereinafter appear, for the reception of a wedge member 15 (Fig. 1). As best appears from Fig. 1, the opening 14 is of tapered height so that the uppermost internal wall portion of the puller block 12 lies closely adjacent to the wedge member 15, as shown.

As will appear from Figs. 1 and 2, the width or depth of the passage 14 is also, by preference, such that, in addition to receiving the wedge 15, the opening 14 is sufficient to accommodate a pressure block 16 (Fig. 5). The block 16 consists, by preference, of a rigid bar or strip of specially treated metal, the opposite ends of which are undercut as at 17, to form shoulders 18 for a purpose hereinafter appearing.

Disposed by preference in surrounding relation to the stud puller block 12 and the nut enclosed thereby, is a housing member 19, preferably in the form of a cylindrical sleeve, one end of which is transversely kerfed so as to provide diametrally opposed steps related in pair, there being illustrated an arrangement employing three of such pairs of steps. The first pair of steps designated 20, lie at the greatest depth from the forward or outermost end of the step housing; a second pair of steps 21 are disposed at an intermediate depth, and a third pair of steps 22 are disposed at a relatively short distance below the adjacent end of the housing. It will be understood that, of course, a fourth stage or step is provided by the end face of the housing itself, the paired surfaces being indicated at 23. As will appear from Fig. 1, the relation of parts in assembly, is such that the pressure block 16 may be disposed in bridging relation to any pair of the related steps, and thus located at selected and adjusted distance from the face of the member 7. As will appear from Fig. 1, the undercut portion 17 serves to engage the paired seats on the housing 19, and the shoulders 18 serve to prevent any endwise movement if the pressure block 16, once the wedge 15 is applied and started to be driven up.

The manner of assembly of the parts of my device, preparatory to its use, is thought to be clear from the drawing, but may be briefly set forth to insure completeness of description, as follows: A nut 9, selected so that its tapped portion 10 will correspond in pitch and size to the stud end, is inserted in the pocket 11 of the stud puller block 12. The nut and block thus related, may be turned down upon the projecting stud end so as to bring the lower face of the block 12 into engagement with the exposed face of the member 7 from which the stud is to be extracted. The step housing 19, the internal diameter of which preferably corresponds approximately to the external diameter of block 12, may then be inserted thereover, and, in like manner, brought to bear against the face of the element 7. From the relation of parts illustrated, it is seen that the housing 19 serves as a compression member, in the nature of a fulcrum for the wedge. It will, of course, be understood that the depth or endwise dimension of the housing 19 is determined according to the particular class of work to be handled and with regard to the extent of projection of the free stud end. Assuming the relation of parts to be substantially as shown in Figs. 1 and 2, in assembly the pressure block 16 is then passed through the eye or channel 14 of the member 12 and brought into bridging relation, preferably with the lowermost pair of steps, such as 20 (Fig. 6). The wedge member 15 may then be inserted endwise through the remaining upper portion of the channel 14 and driven up to tightness, when the operation of extraction is ready to be undertaken.

Extraction of the stud is effected by driving the wedge member 15 either with a sledge or other heavy hammer, or by the use of an air hammer or like device, with the effect that, as the wedge is seated increasingly deeper through the passage or opening 14, the stud is slowly extracted from the member 7. It will appear, however, that, as a wedge member of gradual taper is preferably utilized, the clearance between the lower wall of channel 14 and the under surface of block 16, will gradually be decreased. In the event that such clearance is lost, and the stud member still not free of the casting, it will be necessary to remove the wedge, and to reseat the pressure block 16 on the next higher pair of seats, such as 21. Additional clearance being thus provided below the pressure block, the wedge may be reinserted, and driven further. If necessary, in order to pull the stud entirely free, the wedge may be repeatedly retracted, and the pressure block advanced to successive pairs of steps 22 and 23 until extraction is entirely completed, and the stud may be easily manually removed. It will be seen that, upon advancing the pressure block to successive steps on the housing, it is merely necessary to back up the wedge to an extent enabling the housing to be manually rotated into the desired angular relation with the pressure block and other parts internal to the housing.

My preference in choice of materials in constructing a device according to the present invention is to utilize, either metals of substantial hardness, or to assure the hardness and other desirable characteristics of the several elements, as by heat treating, case hardening or other suitable treatment. Such special treatment is usually desirable by reason of the high unit pressures to which, particularly the wedge member 15, the pressure block 16, and the puller block 12, are subjected. As before mentioned, the nut 9 is preferably specially treated for hardness so as to withstand the wear incident to its repeated use.

It will appear from the foregoing description that a device in accordance with this invention is particularly adapted for the extraction and removal of studs or similar threaded members of substantial size; that the device may be manipulated in a minimum of space, that it lends itself admirably to general shop use in that a number of the nuts 9 may be selectively employed with the remaining elements of the assembly, and thus the device rendered adaptable to a wide range of stud sizes, and that the several objects and advantages heretofore enumerated are fully attained.

While the invention has been described by making reference, in detail, to a single executional embodiment of the invention, such description is to be understood solely in a descriptive and not in a limiting sense, since a number of changes in the parts, their combinations, and their coacting relation, may be made without departure from the spirit and full intended scope of the invention, as defined by the appended claims.

I claim as my invention:

1. In a device for pulling threaded studs and the like, a tension member adapted for engagement with the stud to be extracted, and having a transverse passage therethrough adapted to receive a wedge, a compression member substantially surrounding the tension member having pairs of diametrally opposed wedge-engaging surfaces formed inwardly of one of its ends, the surfaces being arranged in two series of contiguous steps, a wedge extending transversely of the tension and compression members, disposed in bearing engagement with a said pair of said surfaces, the wedge and members being arranged, as the wedge is driven, to cause a movement of the tension member, outwardly of the compression member, said wedge being adapted to be transferred from one pair of said surfaces to any other pair thereof without removing the wedge from the compression member.

2. In a device for extracting threaded studs and the like, an eye element, a nut carried by the eye element and adapted for detachable engagement with a stud or like member to be extracted, a sleeve surrounding the eye element, the outer end surface of said sleeve having two series of contiguous steps, pairs of diametrally opposite steps of said series lying in common planes, and a wedge extending transversely through the eye of the eye element adapted for bearing engagement with any selected pair of said steps, said wedge being adapted, upon movement relative to said eye and sleeve elements, to cause a movement of the eye element and stud, outwardly through said sleeve element.

3. An extractor for threaded studs and the like, including a puller having a pair of transverse openings therethrough, a nut carried in one of said openings, a wedge adapted to be driven transversely through the other of said openings and a collar surrounding the puller, the outer end of said collar being provided with two series of stepped, contiguous surfaces, said series having diametrally opposite surfaces lying in a common plane and forming paired bearing seats for the wedge.

4. An extractor for threaded studs, including a puller block having transverse passages therethrough, a nut disposed in one of said passages and adapted for detachable engagement with the stud to be extracted, a substantially cylindrical housing enclosing the puller block, the outer end of said housing being provided with a series of contiguous steps, a pressure block extending through another opening of the puller block and adapted to engage diametrally opposite stepped surfaces on the end of said housing, a wedge adapted to extend through the last named opening of the puller block and having its opposite surfaces bearing against said pressure block and the outermost inside surface of the puller block opening through which it extends, said surface of the last named puller block opening being tapered transversely, and corresponding substantially to the taper of the wedge, said pressure block having a shouldered under surface, adapted, upon engagement with the stepped portions of the housing, to prevent endwise movement of the pressure block as the wedge is driven.

MILTON MATHEWS.